(12) United States Patent
Kurata et al.

(10) Patent No.: US 11,194,240 B2
(45) Date of Patent: Dec. 7, 2021

(54) LIGHT SOURCE APPARATUS AND PROJECTION TYPE DISPLAY APPARATUS USING THE SAME

(71) Applicant: CANON KABUSHIKI KAISHA, Tokyo (JP)

(72) Inventors: Yuya Kurata, Utsunomiya (JP); Hiroshi Yamamoto, Ageo (JP); Kimiya Hoshino, Utsunomiya (JP); Satoshi Nishikawa, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/883,821

(22) Filed: May 26, 2020

(65) Prior Publication Data
US 2020/0285138 A1    Sep. 10, 2020

Related U.S. Application Data

(63) Continuation of application No. PCT/JP2018/043105, filed on Nov. 22, 2018.

(30) Foreign Application Priority Data

Nov. 29, 2017 (JP) .............................. JP2017-229552
Oct. 31, 2018  (JP) .............................. JP2018-205875

(51) Int. Cl.
| | |
|---|---|
| *G03B 21/20* | (2006.01) |
| *H04N 9/31* | (2006.01) |
| *G02B 27/14* | (2006.01) |
| *G02B 26/00* | (2006.01) |
| *G02B 27/28* | (2006.01) |

(52) U.S. Cl.
CPC ......... *G03B 21/204* (2013.01); *G02B 26/008* (2013.01); *G02B 27/141* (2013.01); *G02B 27/285* (2013.01); *G03B 21/2013* (2013.01); *H04N 9/3161* (2013.01); *H04N 9/3164* (2013.01)

(58) Field of Classification Search
CPC .............. G03B 21/204; G03B 21/2013; H04N 9/3161; H04N 9/3164
See application file for complete search history.

(56) References Cited

U.S. PATENT DOCUMENTS

2014/0354956 A1* 12/2014 Yamada ............... H04N 9/3167
353/20
2017/0343891 A1* 11/2017 Sakata ................. G03B 21/206

FOREIGN PATENT DOCUMENTS

| JP | 2008216840 A | 9/2008 |
|---|---|---|
| JP | 2010102049 A | 5/2010 |
| JP | 2012008549 A | 1/2012 |
| JP | 2016186892 A | 10/2016 |
| JP | 2016218303 A | 12/2016 |
| JP | 2017072788 A | 4/2017 |
| JP | 2017097258 A | 6/2017 |

(Continued)

*Primary Examiner* — Ryan D Howard
(74) *Attorney, Agent, or Firm* — Canon U.S.A., Inc. IP Division

(57) ABSTRACT

A light source apparatus includes a red LD array that emits light in a red bandwidth, a blue LD array that emits light in a blue bandwidth, and a light combining part that includes a transmissive region and a reflecting region, the transmissive region transmitting the light emitted from the red LD array therethrough, the reflecting region reflecting the light emitted from the blue LD array.

19 Claims, 13 Drawing Sheets

(56) References Cited

FOREIGN PATENT DOCUMENTS

| WO | 2013-046243 A1 | 4/2013 |
| WO | 2013/105546 A1 | 7/2013 |
| WO | 2016/181858 A1 | 11/2017 |

\* cited by examiner

LIGHT SOURCE APPARATUS AND PROJECTION TYPE DISPLAY APPARATUS USING THE SAME

CROSS-REFERENCE TO RELATED APPLICATIONS

This application is a Continuation of International Patent Application No. PCT/JP2018/043105, filed Nov. 22, 2018, which claims the benefit of Japanese Patent Application No. 2017-229552, filed Nov. 29, 2017 and Japanese Patent Application No. 2018-205875, filed Oct. 31, 2018, all of which are hereby incorporated by reference herein in their entirety.

BACKGROUND OF THE INVENTION

Field of the Invention

The present invention relates to a light source apparatus and a projection type display apparatus using the same.

Description of the Related Art

As a projector that is capable of displaying a color image by using a blue laser diode (hereafter referred to as "blue LD") that emits blue light and a yellow fluorescent body that converts a part of the blue light emitted from the blue LD into green light and red light, a projector disclosed in Japanese Patent Application Laid-Open No. 2016-186892 is known.

Japanese Patent Application Laid-Open No. 2016-186892 discloses a projector that uses a light source apparatus combining blue light rays emitted from two blue LD arrays by a light combining part that includes transmissive regions and reflecting regions that are alternately disposed, and guiding a part of the combined blue light rays to a yellow fluorescent body.

Although a yellow fluorescent body is capable of emitting green light and red light, the yellow fluorescent body tends to have insufficient red light with respect to the green light. Therefore, the projector that is described in Japanese Patent Application Laid-Open No. 2016-186892 mentioned above in which only red light emitted from the yellow fluorescent body is used as the red light that is used in a projected image has difficulty projecting a reddish image with sufficient brightness.

SUMMARY OF THE INVENTION

The present invention provides a light source apparatus that is capable of projecting a brighter image than before, and a projection type display apparatus using the same.

To this end, a light source apparatus of the present invention includes a first light source part that emits light in a first wavelength bandwidth, a second light source part that emits light in a second wavelength bandwidth differing from the first wavelength bandwidth of the light in the first wavelength bandwidth, and a light combining part that includes a transmissive region and a reflecting region, the transmissive region transmitting the light emitted from the first light source part therethrough, the reflecting region reflecting the light emitted from the second light source part. In the light source apparatus, one of the light in the first wavelength bandwidth and the light in the second wavelength bandwidth is light in a blue bandwidth, and the other of the light in the first wavelength bandwidth and the light in the second wavelength bandwidth is light in a red bandwidth.

Further features of the present invention will become apparent from the following description of exemplary embodiments with reference to the attached drawings.

DESCRIPTION OF THE EMBODIMENTS

Embodiments of the present invention are described below with reference to the drawings.

Figure 1:
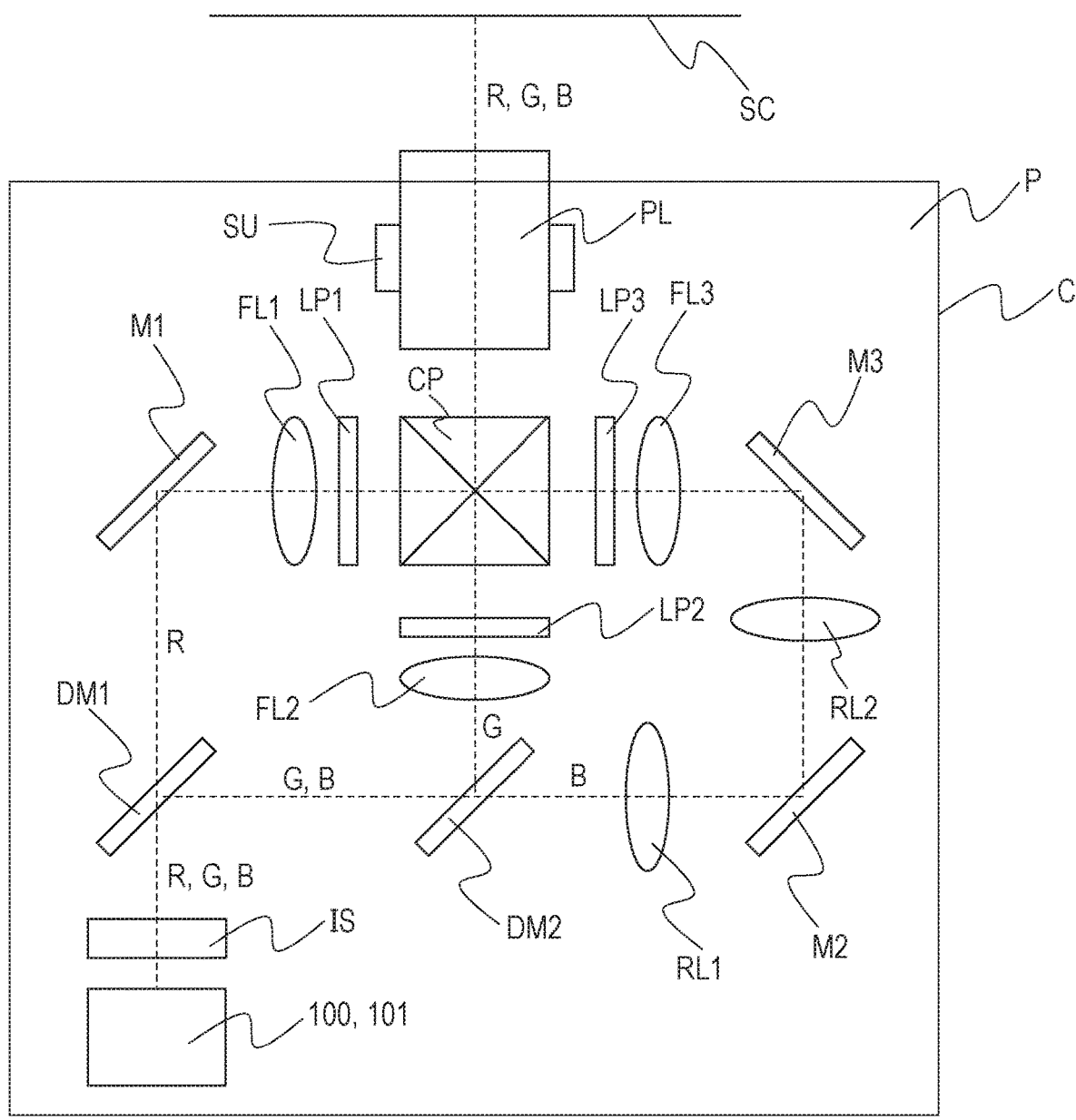
FIG. 1 illustrates a structure of a projection type display apparatus including a light source apparatus of each embodiment.

Structure of Projection Type Display Apparatus First, referring to FIG. 1, a structure of a projector (projection type display apparatus) P that allows a light source apparatus of each embodiment described below to be installed is described.

The projector P includes a light source apparatus 100, a light modulating part that modulates light emitted from the light source apparatus 100, and a holding part SU for holding a projection lens (projection optical system) PL that projects an image onto a screen (projection surface) SC. The so-called light modulating part is a general term for a red-light light modulating part LP1, a green-light light modulating part LP2, and a blue-light light modulating part LP3, which are described below. In FIG. 1, in the light modulating part, the red-light light modulating part LP1, the green-light light modulating part LP2, and the blue-light light modulating part LP3 are each constituted by a transmissive liquid crystal panel.

The holding part SU may removably hold the projection lens PL, or the projection lens PL may be irremovable from the holding part SU. The holding part SU may be formed as a shifting part that allows the projection lens PL to shift in a direction orthogonal to an optical axis of the projection lens PL while the holding part SU holds the projection lens PL.

The projector P further includes an illumination optical system IS, a color separation combining system and the projection lens PL. The so-called color separation combining system includes dichroic mirrors DM1 and DM2 (described below), mirrors M1, M2, and M3, field lenses FL1, FL2, and FL3, and relay lenses RL1 and RL2.

Red light R, green light G, and blue light B that are emitted by the light source apparatus 100 and a light source apparatus 101 in corresponding embodiments described below are incident upon the dichroic mirror DM1 via the illumination optical system IS. The dichroic mirror DM1 has the property of transmitting the red light R therethrough and reflecting the green light G and the blue light B. The illumination optical system IS includes, for example, a first fly-eye lens, a second fly-eye-lens, and a polarization conversion part that causes polarization directions to be the same particular direction, and has the function of illuminating the light modulating part with a uniform illumination distribution.

Optical Path of Red Light R

The red light R transmitted through the dichroic mirror DM1 is incident upon the red-light light modulating part LP1 via the mirror M1 and the field lens FL1. The red light R incident upon the red-light light modulating part LP1 is modulated by the red-light light modulating part LP1 on the basis of an image signal, and is incident upon a combining prism CP.

Optical Path of Green Light G

The green light G reflected by the dichroic mirror DM1 is incident upon the dichroic mirror DM2. The dichroic mirror DM2 has the property of reflecting the green light G and transmitting the blue light B therethrough. The green light G reflected by the dichroic mirror DM2 is incident upon the green-light light modulating part LP2 via the field lens FL2. The green light G incident upon the green-light light modulating part LP2 is modulated by the green-light light modulating part LP2 on the basis of an image signal, and is incident upon the combining prism CP.

Optical Path of Blue Light B

The blue light B reflected by the dichroic mirror DM1 is transmitted through the dichroic mirror DM2. The blue light B transmitted through the dichroic mirror DM2 is incident upon the blue-light light modulating part LP3 via the relay lens RL1, the mirror M2, the relay lens RL2, the mirror M3, and the field lens FL3. The blue light B incident upon the blue-light light modulating part LP3 is modulated by the blue-light light modulating part LP3 on the basis of an image signal, and is incident upon the combining prism CP.

The red light R, the green light G, and the blue light B incident upon the combining prism CP in the optical paths above are guided to the projection lens PL by the combining prism CP and finally reach the screen SC.

First Embodiment

Structure of Light Source Apparatus 100

Next, a structure of the light source apparatus 100 as a first embodiment of the present invention is described with reference to FIG. 2.

Figure 2:
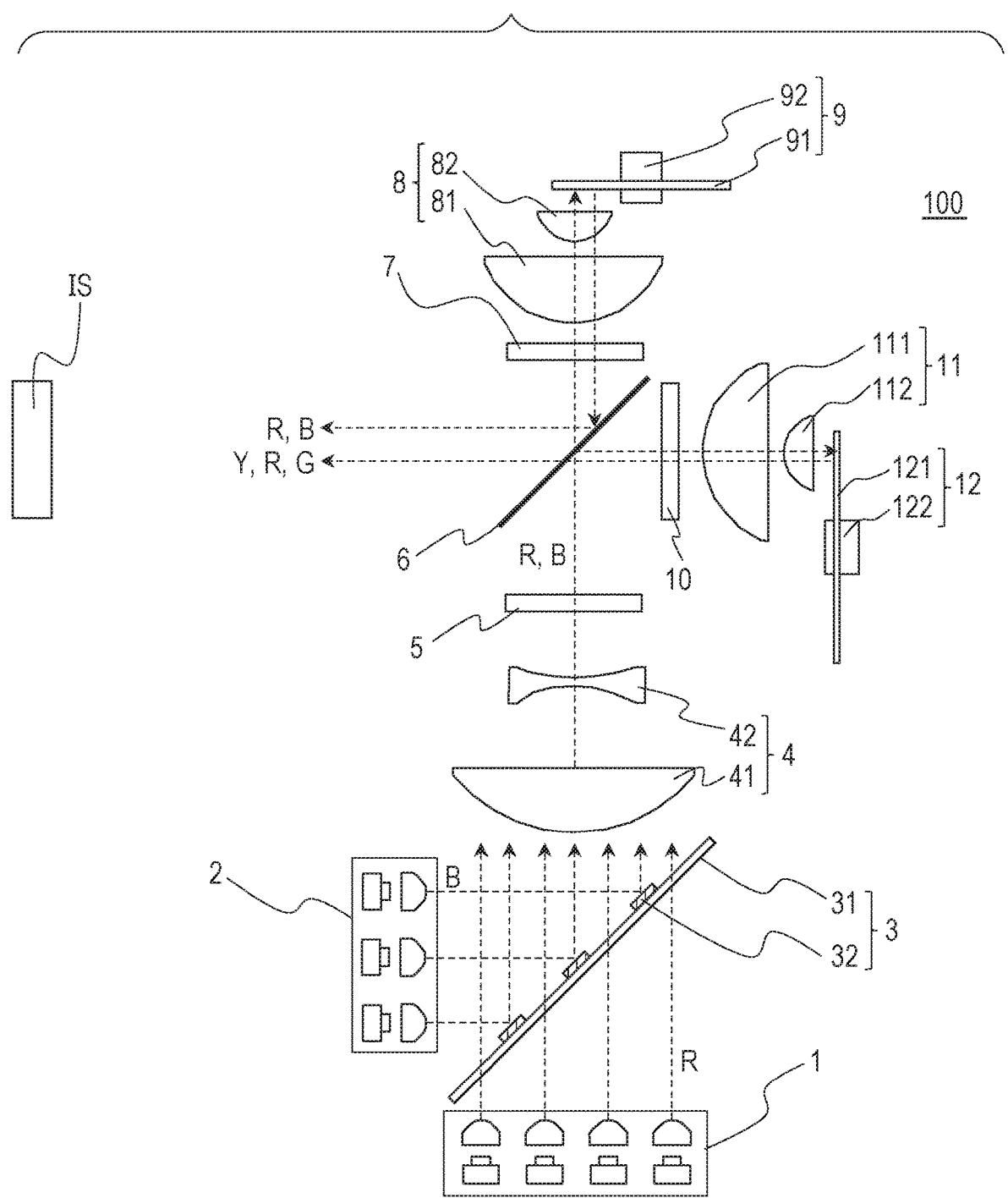
FIG. 2 illustrates a structure of a light source apparatus of a first embodiment.

As shown in FIG. 2, the light source apparatus 100 includes a red LD array (first light source part) 1 that emits red light (light in a first wavelength bandwidth), and a blue LD array (second light source part) 2 that emits blue light B (light in a second wavelength bandwidth). The light source apparatus 100 further includes a light combining part 3 including transmissive regions that transmit the red light R therethrough and reflecting regions that reflect the blue light B.

Figure 3A:
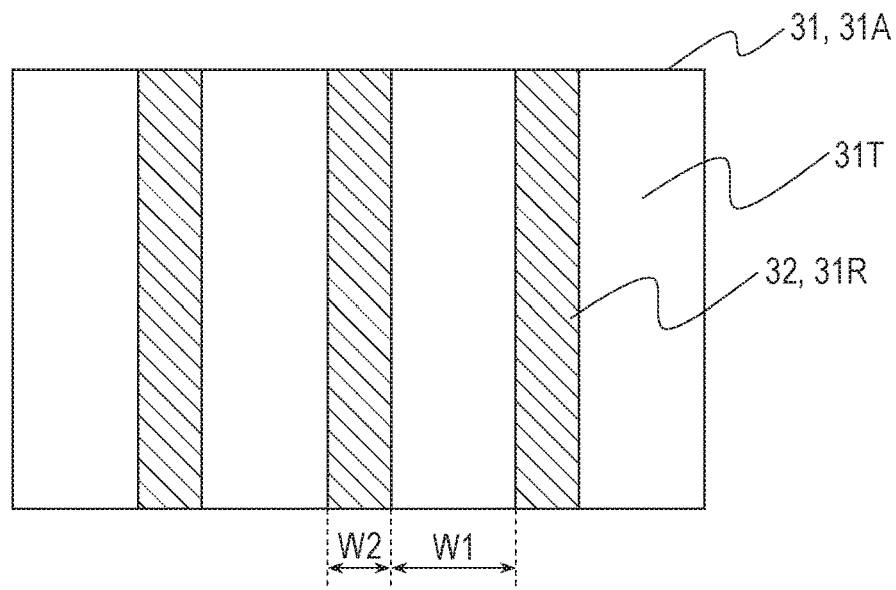
FIG. 3A illustrates a structure of a light combining part of the light source apparatus of each embodiment.
Figure 3B:
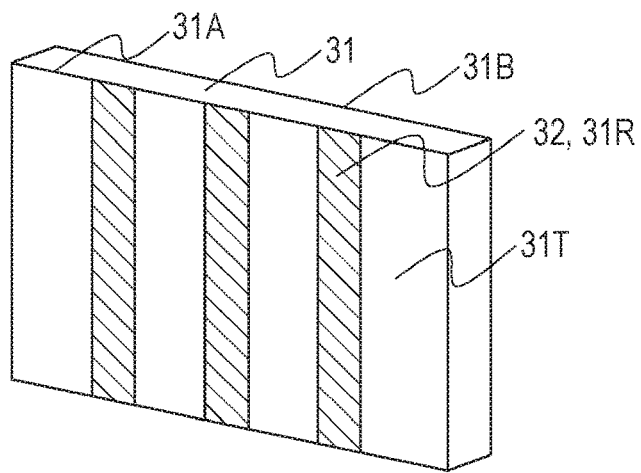
FIG. 3B illustrates the structure of the light combining part of the light source apparatus of each embodiment.

As shown in FIGS. 3A and 3B, the light combining part 3 has a structure in which a part of a surface 31A of surfaces of a transparent substrate 31 is provided with an aluminum reflecting film 32 (reflecting part), the surface 31A being provided on a side where the blue LD array 2 is provided. The transmissive regions above are regions 31T of the transparent substrate 31 where the aluminum reflecting film 32 is not provided, and the reflecting regions above are regions 31R where the aluminum reflecting film 32 is provided. That is, the light combining part 3 includes the transparent substrate 31 that includes the reflecting part including the reflecting regions and a transmissive part including the transmissive regions.

Figure 3C:
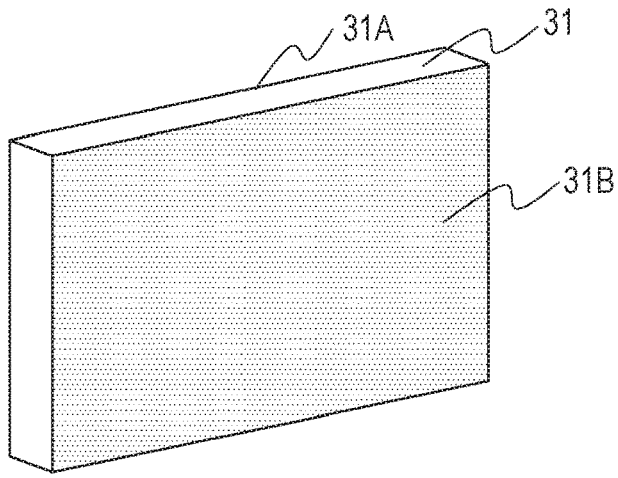
FIG. 3C illustrates the structure of the light combining part of the light source apparatus of each embodiment.

As shown in FIG. 3C, an antireflection film is provided on a surface 31B of the surfaces of the transparent substrate 31, the surface 31B being provided on a side where the red LD array 1 is provided. This makes it possible to guide almost all of the red light R emitted from the red LD array 1 to the light combining part 3.

The light source apparatus 100 further includes a compression optical system 4 that includes a positive lens 41 and a negative lens 42, and a half-wave plate (first phase difference plate) 5 that is rotatable with a direction parallel to a direction of propagation of light exiting from the light combining part 3 defining a rotation axis. By narrowing the width of light exiting from the light combining part 3 by the compression optical system 4, it is possible to reduce the size of each optical member that is provided beyond the compression optical system 4, and to reduce the size of the entire light source apparatus 100. By rotating the half-wave plate 5, it is possible to change the ratio between, of the light exiting from the light combining part 3, the light quantity of light that is guided to a fluorescent body unit 12 (described later) and the light quantity of light that is guided to a diffusing body unit 9. As a result, it is possible to adjust the color tone of a projected image.

The light source apparatus 100 further includes a polarization beam splitting part 6, a quarter-wave plate (second phase difference plate) 7, a condensing optical system 8 that includes condensing lenses 81 and 82, and the diffusing body unit (diffusing part) 9 that includes a diffusing body wheel 91 and a motor 92. The condensing optical system 8 has the function of guiding light exiting from the quarter-wave plate 7 to the diffusing body wheel 91, and while causing the light exiting from the diffusing body wheel 91 to be taken in, collimating the light and guiding the light to the quarter-wave plate 7. The diffusing body wheel 91 has a structure in which a diffusing layer for diffusing light exiting from the quarter-wave plate 7 is provided in the form of a ring on an aluminum substrate. Since the diffusing body wheel 91 is rotated by the motor 92, it is possible to prevent light from continuing to strike a particular location of the diffusing layer and to suppress deterioration of the diffusing layer.

The light source apparatus 100 further includes a quarter-wave plate (third phase difference plate) 10, a condensing optical system 11 that includes condensing lenses 111 and 112, and the fluorescent body unit (wavelength conversion part) 12 that includes a fluorescent body wheel 121 and a motor 122. The condensing optical system 11 has the function of guiding light exiting from the quarter-wave plate 10 to the fluorescent body wheel 121, and while causing light exiting from the fluorescent body wheel 121 to be taken in, collimating the light and guiding the light to the quarter-wave plate 10. The fluorescent body wheel 121 has a structure in which a yellow fluorescent body layer for converting the wavelength of the light exiting from the quarter-wave plate 10 is provided in the form of a ring on an aluminum substrate. Since the fluorescent body wheel 121 is rotated by the motor 122, it is possible to prevent light from continuing to strike a particular location of the yellow fluorescent body layer and to suppress deterioration of the yellow fluorescent body layer.

Optical Paths of Blue Light $B_{LD}$

Figure 4:
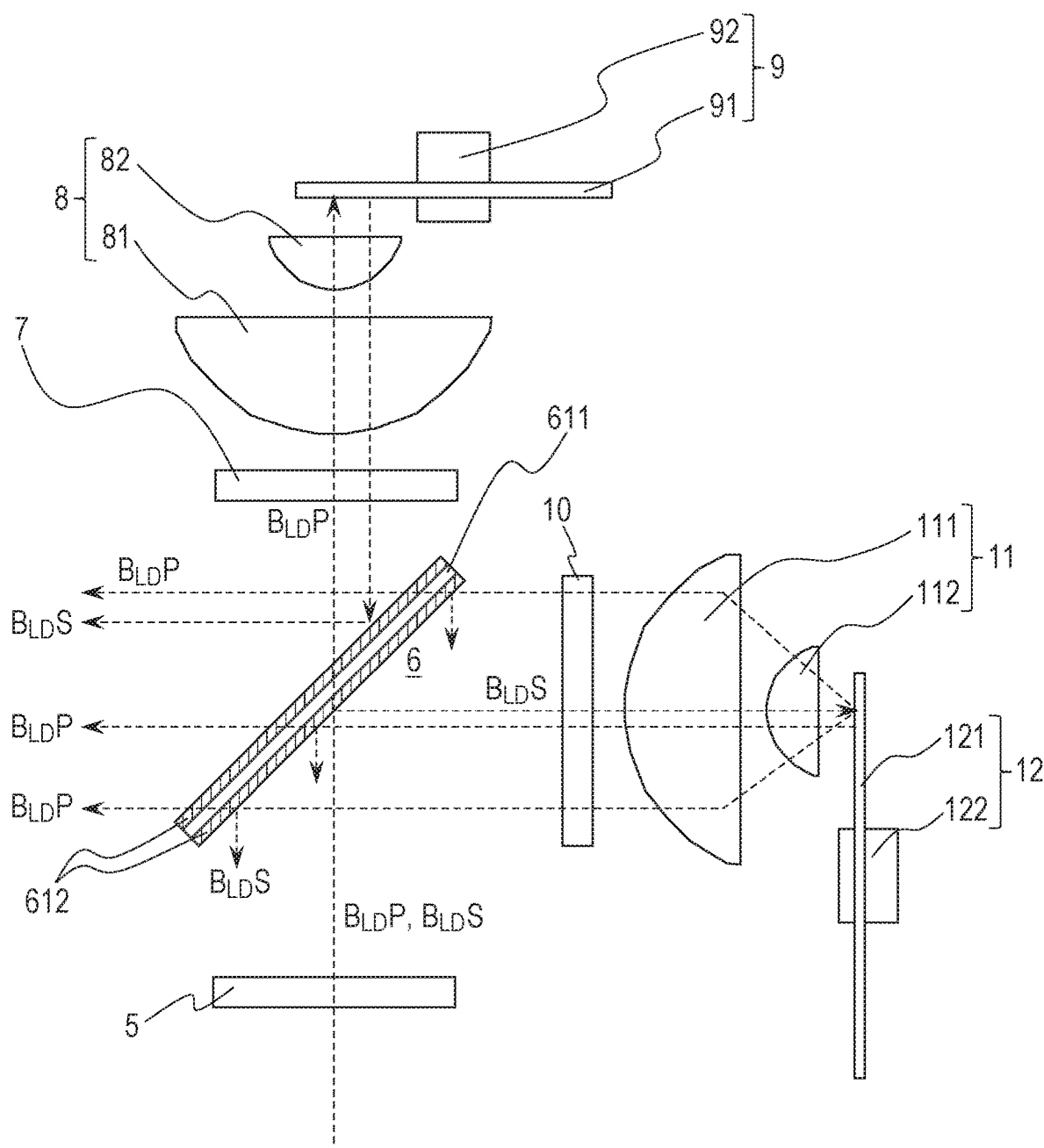
FIG. 4 illustrates an optical path of blue light in the light source apparatus of the first embodiment.

Optical paths in which blue light $B_{LD}$ emitted from the blue LD array 2 is guided to the illumination optical system IS via the diffusing body unit 9 and the fluorescent body unit 12 are described with reference to FIG. 4. As mentioned above, by rotating the half-wave plate 5, it is possible to change the ratio between, of light exiting from the light combining part 3, the light quantity of light that is guided to the fluorescent body unit 12 (described later) and the light quantity of light that is guided to the diffusing body unit 9. In other words, by rotating the half-wave plate 5, it is possible to adjust the ratio between blue light $B_{LD}S$ of S-polarized light (light travelling in a first polarization direction) exiting from the half-wave plate 5 and blue light $B_{LD}P$ of P-polarized light (light travelling in a second polarization direction). In the description of the optical paths of blue light $B_{LD}$, it is assumed that the ratio between the blue light $B_{LD}S$ of the S-polarized light and the blue light $B_{LD}P$ of the P-polarized light is 1:1.

Figure 7:
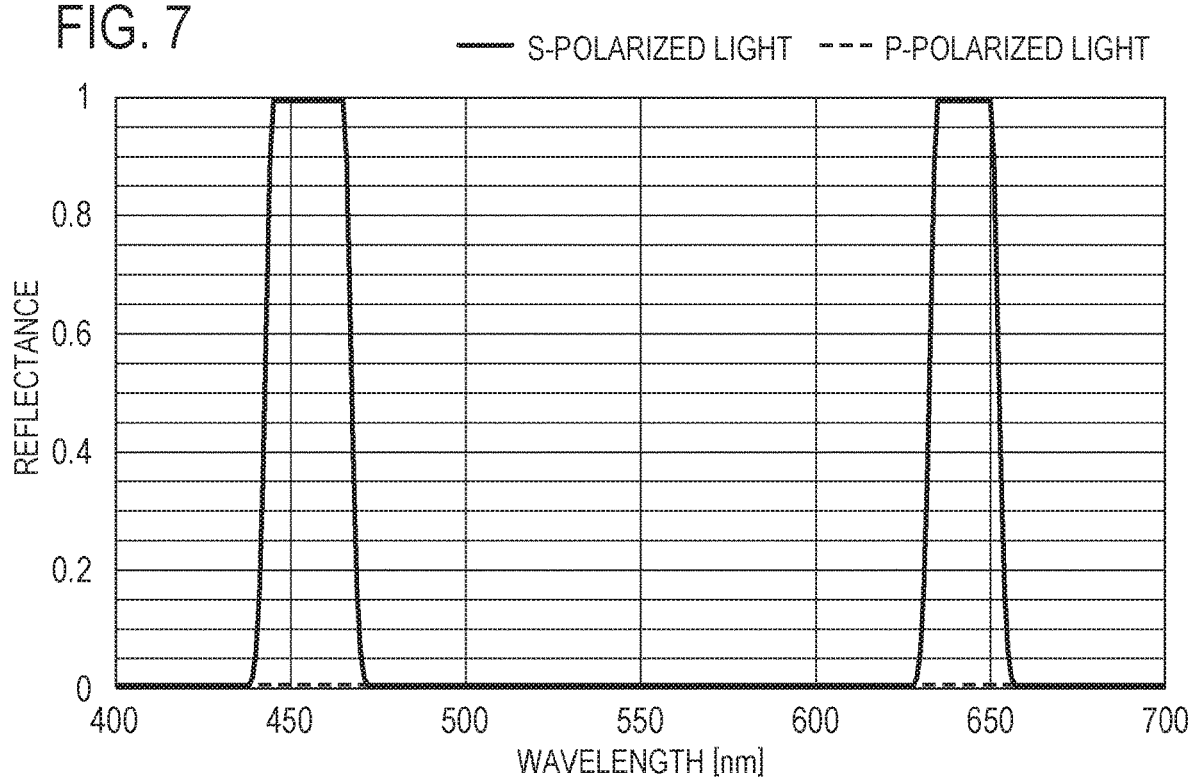
FIG. 7 is a characteristic diagram of polarization beam splitting films in each embodiment.

The blue light $B_{LD}S$ of the S-polarized light and the blue light $B_{LD}P$ of the P-polarized light exiting from the half-wave plate 5 are incident upon polarization beam splitting films (polarization beam splitting regions) 612 of the polarization beam splitting part 6. The polarization beam splitting films 612 are provided on the entire surfaces of a transparent substrate 611 of the polarization beam splitting part 6. The characteristics of the polarization beam splitting films 612 are described with reference to FIG. 7. As shown in FIG. 7, the polarization beam splitting films 612 perform polarization beam splitting on the blue light $B_{LD}$ (having a wavelength of 450 nm) emitted from the blue LD array 2 and red light $R_{LD}$ (having a wavelength of 640 nm) emitted from the red LD array 1. Each polarization beam splitting film 612 has the property of reflecting or transmitting (transmitting in the present embodiment) types of light other than the aforementioned types of light regardless of polarization directions.

That is, the polarization beam splitting part 6 (the polarization beam splitting films 612) performs polarization beam splitting on light in a first predetermined wavelength bandwidth including the light in the first wavelength bandwidth and on light in a second predetermined wavelength bandwidth including the light in the second wavelength bandwidth. In addition, the polarization beam splitting part 6 transmits or reflects types of light in wavelength bandwidths differing from those of the light in the first predetermined wavelength bandwidth and the light in the second predetermined wavelength bandwidth. In FIG. 7, the light in the first wavelength bandwidth is the red light $R_{LD}$ (having a wavelength of 640 nm) emitted from the red LD array 1 and the light in the second wavelength bandwidth is the blue light $B_{LD}$ (having a wavelength of 450 nm) emitted from the blue LD array 2. The light in the first predetermined wavelength bandwidth and the light in the second predetermined bandwidth refer to light of a range in which the reflectance thereof becomes 50%). In FIG. 7, light having wavelengths of approximately 440 to 470 nm is the light in the second predetermined wavelength bandwidth, and light having wavelengths of approximately 630 to 653 nm is the light in the first predetermined wavelength bandwidth.

Of the blue light $B_{LD}S$ of the S-polarized light and the blue light $B_{LD}P$ of the P-polarized light exiting from the half-wave plate 5, the blue light $B_{LD}S$ of the S-polarized light is reflected by the polarization beam splitting film 612 and is guided to the quarter-wave plate 10, and the blue light $B_{LD}P$ of the P-polarized light is transmitted through the polarization beam splitting films 612 and is guided to the quarter-wave plate 7.

The blue light $B_{LD}S$ of the S-polarized light reflected by the polarization beam splitting film 612 is incident upon the yellow fluorescent body layer of the fluorescent body wheel 121 via the quarter-wave plate 10 and the condensing optical system 11. The yellow fluorescent body layer has the property of converting the wavelength of at least a part of the blue light, which is excitation light, to the wavelength of yellow light (red light or green light) as fluorescent light having a wavelength that is longer than the wavelength of the blue light.

Unconverted blue light of the blue light $B_{LD}S$ of the S-polarized light whose wavelength has not been converted by the yellow fluorescent body layer is incident upon the polarization beam splitting film 612 via the condensing optical system 11 and the quarter-wave plate 10. The polarization direction of the unconverted blue light incident upon the polarization beam splitting film 612 is disturbed, so that, of the unconverted blue light, a component of the S-polarized light is reflected by the polarization beam splitting film 612 and returns to the blue LD array 2. However, a component of the P-polarized light is transmitted through the polarization beam splitting films 612 and is guided to the illumination optical system IS.

On the other hand, the blue light $B_{LD}P$ of the P-polarized light transmitted through the polarization beam splitting films 612 is guided to the diffusing body wheel 91 via the quarter-wave plate 7 and the condensing optical system 8. Blue light diffused by the diffusing body wheel 91 is incident upon the other polarization beam splitting film 612 via the condensing optical system 8 and the quarter-wave plate 7. That is, the blue light that moves in the direction of the diffusing body unit 9 from the polarization beam splitting films 612 is transmitted through the quarter-wave plate 7 twice until the blue light is incident upon the polarization beam splitting film 612 again, so that the blue light becomes blue light $B_{LD}S$ of S-polarized light, is reflected by the other polarization beam splitting film 612, and is guided to the illumination optical system IS.

Optical Paths of Red Light $R_{LD}$

Figure 5:
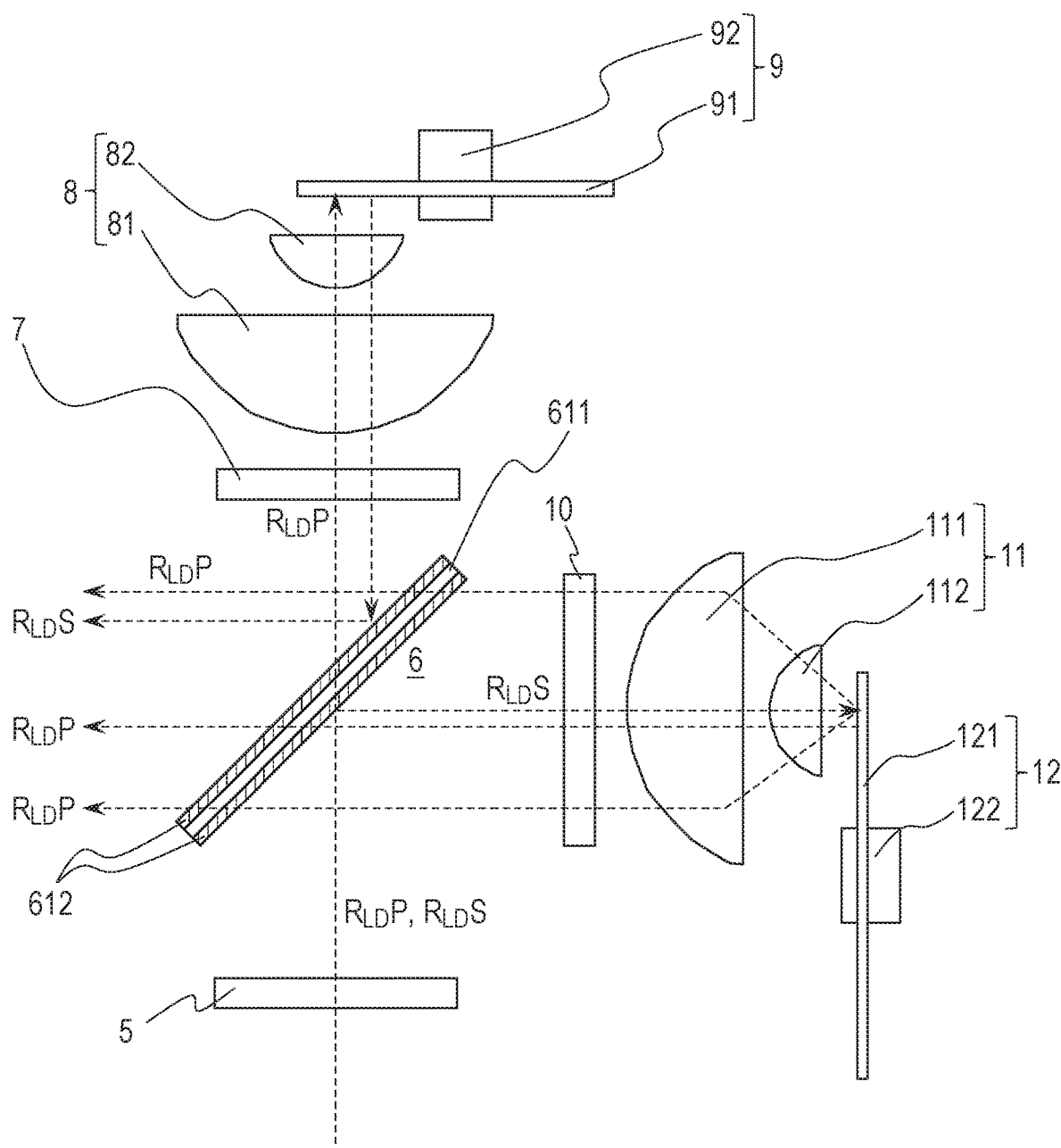
FIG. 5 illustrates an optical path of red light in the light source apparatus of the first embodiment.

Optical paths in which the red light $R_{LD}$ emitted from the red LD array 1 is guided to the illumination optical system IS via the diffusing body unit 9 and the fluorescent body unit 12 are described with reference to FIG. 5. Similarly to the description of the optical paths of the blue light $B_{LD}$ above, even in the description of the optical paths of the red light $R_{LD}$, it is assumed that the ratio between red light $R_{LD}S$ of S-polarized light and red light $R_{LD}P$ of P-polarized light is 1:1.

The red light $R_{LD}S$ of the S-polarized light reflected by the polarization beam splitting film 612 is incident upon the yellow fluorescent body layer of the fluorescent body wheel 121 via the quarter-wave plate 10 and the condensing optical system 11. Unlike the blue light $B_{LD}$ above, the red light incident upon the yellow fluorescent body layer does not have its wavelength converted and its polarization direction disturbed, and is incident upon the polarization beam splitting film 612 again via the condensing optical system 11 and the quarter-wave plate 10.

That is, the red light that moves in the direction of the fluorescent body unit 12 from the polarization beam splitting film 612 is transmitted through the quarter-wave plate 10 twice until the red light is incident upon the polarization beam splitting film 612 again, so that the red light exiting from the quarter-wave plate 10 becomes P-polarized light. Therefore, red light $R_{LD}P$ of the P-polarized light exiting from the quarter-wave plate 10 is transmitted through the polarization beam splitting films 612 and is guided to the illumination optical system IS. On the other hand, the red light $R_{LD}P$ of the P-polarized light that is transmitted through the half-wave plate 5 and the polarization beam splitting films 612 and moves toward the quarter-wave plate 7, the condensing optical system 8, and the diffusing body unit 9 moves along an optical path that is the same as the optical path of the blue light $B_{LD}P$ of the P-polarized light transmitted through the polarization beam splitting films 612. Then, finally, the red light $R_{LD}P$ becomes red light $R_{LD}S$ of S-polarized light and is guided to the illumination optical system IS.

Optical Paths of Fluorescent Light

Figure 6:
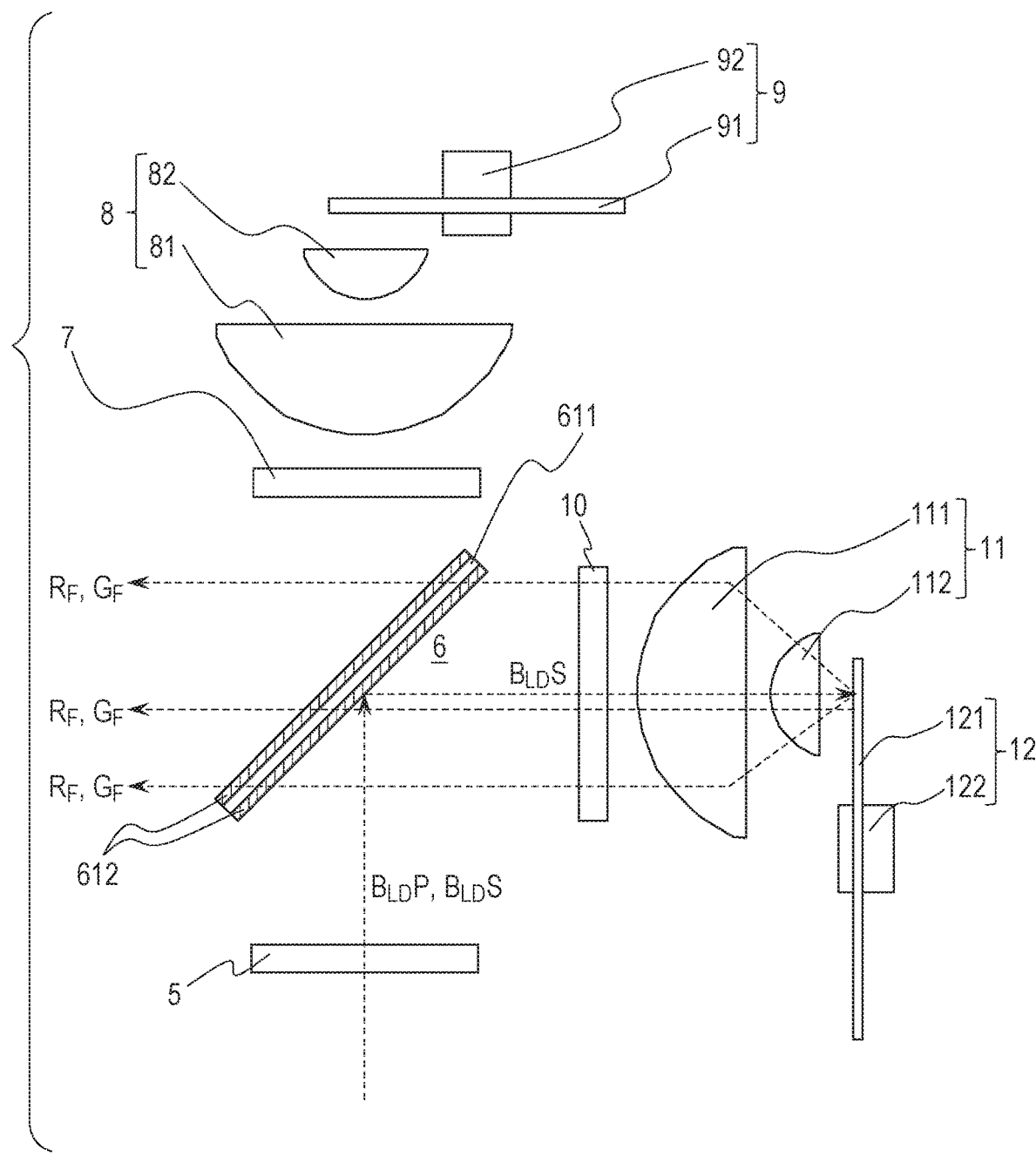
FIG. 6 illustrates an optical path of fluorescent light in the light source apparatus of the first embodiment.

Optical paths in which fluorescent light $R_F$ and fluorescent light $G_F$ exiting from the fluorescent body unit 12 are guided to the illumination optical system IS are described with reference to FIG. 6. As mentioned above, fluorescent light (green light $G_F$ and red light $R_F$) exits from the yellow fluorescent body layer of the fluorescent body wheel 121. Since the polarization beam splitting films 612 have the above-described property, of the fluorescent light $R_F$ and fluorescent light $G_F$ incident upon the polarization beam splitting film 612, components having wavelengths differing from the wavelength of the blue light $B_{LD}$ emitted from a blue-light LD and the wavelength of the red light $R_{LD}$ emitted from a red-light LD are transmitted through the polarization beam splitting films 612 and are guided to the illumination optical system IS. As long as components that are the same as the components of the red light $R_{LD}P$ of the P-polarized light and the blue light $B_{LD}P$ of the P-polarized light are included in the fluorescent light $R_F$ and the fluorescent light $G_F$ incident upon the polarization beam splitting film 612, those components are also transmitted through the polarization beam splitting films 612 and are guided to the illumination optical system IS.

Accordingly, the light source apparatus 100 is capable of guiding the red light, the green light, and the blue light to the illumination optical system IS.

Reasons Allowing Image Brighter than Before to be Projected

Figure 8:
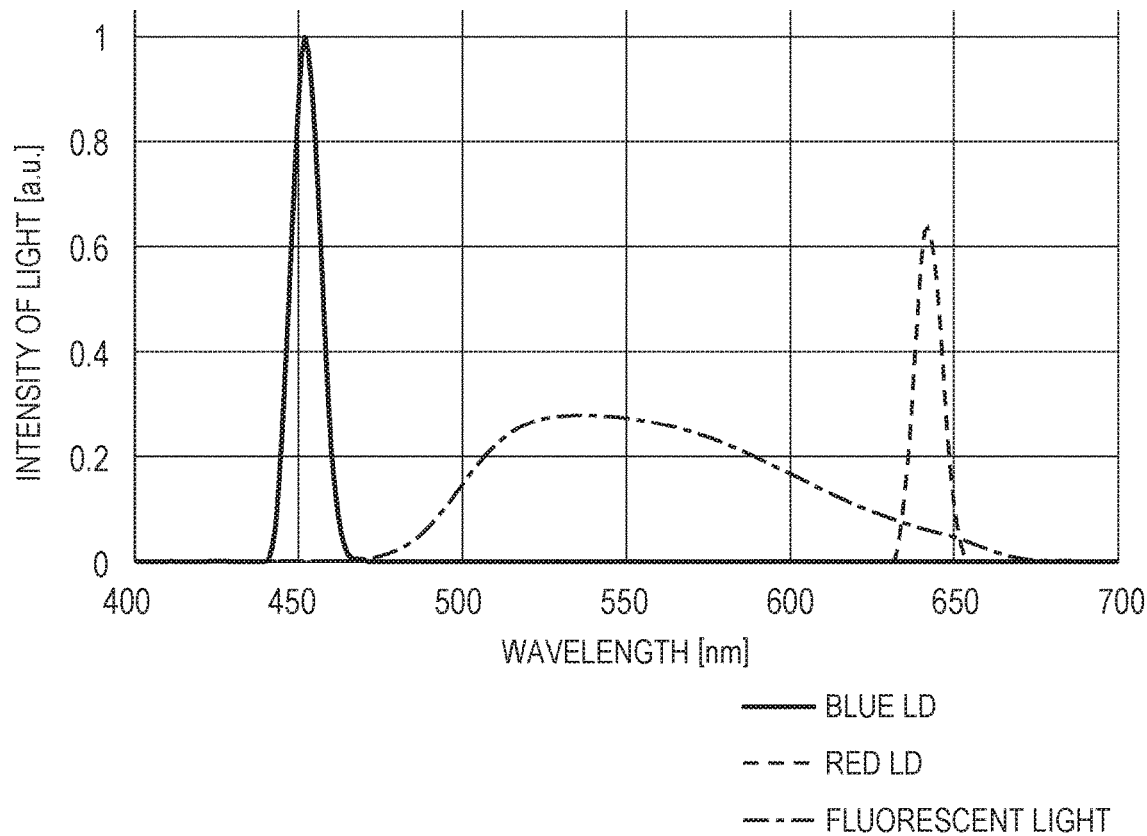
FIG. 8 illustrates a spectral distribution of light emitted from the light source apparatus of each embodiment.

Next, reasons that allowing the light source apparatus 100 of the present embodiment to reproduce wider color areas than before are described with reference to FIG. 8. FIG. 8 illustrates a spectral distribution of light emitted from the light source apparatus 100.

As shown in FIG. 8, the light source apparatus 100 can also emit red light from red LDs in addition to blue light and fluorescent light emitted from blue LDs, which can be emitted by existing light source apparatuses. That is, in the projector P in which the light source apparatus is installed, it is possible to use, as red light that is used in a projected image, red light emitted from the red LDs in addition to the red light that is included in the fluorescent light exiting from the yellow fluorescent body layer. As a result, the light source apparatus 100 is capable of projecting an image that is brighter than before.

Although in order to increase the quantity of red light that is included in the fluorescent light, the number of blue LDs may be increased to increase the quantity of blue light that is incident upon the yellow fluorescent body layer, since there is a limit as to how much the fluorescent body can change the quantity of blue light, there is a limit as to how much the quantity of red light that is included in the fluorescent light is increased. In contrast, in the light source apparatus 100 of the present embodiment, since the quantity of red light is increased by using the red LD array instead of by increasing the quantity of red light that is included in the fluorescent light, it is possible to project an image that is brighter than before regardless of the limitations of the fluorescent body above.

Since, in existing projectors, as mentioned above, there is not enough red light, when projecting an image having an entirely white surface, it is necessary to reduce the quantity of green light and the quantity of blue light in accordance with the small quantity of red light. More specifically, when light modulating parts are reflective types, regarding the green light and the blue light, it is necessary to reduce the reflectance of the light modulating parts for both the green light and the blue light to reduce the quantities of green light and blue light that are guided to the screen.

As a result, although in existing projectors, the brightness of an image having an entirely white surface is reduced, the light source apparatus 100 of the present embodiment is capable of suppressing such a reduction in brightness.

In the light source apparatus 100 of the present embodiment, for example, the red LD array 1 may also include, in addition to the red LDs (first red light sources) that emit red light having a wavelength of 640 nm), red LDs (second red light sources) that emit red light having a wavelength other than 640 nm. This makes it possible to reproduce a wider color area than before.

In the light source apparatus 100 of the present embodiment, since light rays from two light source parts are combined by one light combining part as in existing light source apparatuses, it is possible to increase the brightness above while suppressing the light source apparatus from increasing in size.

More Desirable Forms

Next, structures for increasing the aforementioned effects, or structures for obtaining effects differing from those described above are described.

As shown in FIG. 2, in the light source apparatus 100, red light emitted from the red LD array 1 is transmitted through the light combining part 3, and blue light emitted from the blue LD array 2 is reflected by the light combining part 3. In general, comparing light quantity loss when light is reflected by, for example, an aluminum reflecting film and light quantity loss when light is transmitted through glass, the light quantity loss is lower when light is transmitted. Therefore, by forming the red LD array 1 and the light combining part 3 so that red light emitted from the red LD array 1 is transmitted through the light combining part 3 as in the light source apparatus 100, it is possible to supply a larger quantity of red light that is deficient as described above in existing light source apparatuses.

As shown in FIG. 2, by making the number of red LDs of the red LD array 1 larger than the number of blue LDs of the blue LD array 2, it is possible to suppress the influence of insufficient red light mentioned above. That is, the red LD array 1 (the first light source unit) includes a plurality of red LDs (first light sources), and the blue LD array 2 (the second light source unit) includes a plurality of blue LDs (second light sources). Of the red LD array 1 and the blue LD array 2, it is desirable that the red LD array 1 that emits light in a red bandwidth include a larger number of light sources.

As shown in FIG. 3A, the area of each transmissive region 31T is wider than the area of each reflecting region 31R. Alternatively, a width W1 of each transmissive region 31T is larger than a width W2 of each reflecting region 31R. According to such a structure, even if the red LD array 1 is displaced from a desired position due to, for example, a mounting error, it is possible to suppress light emitted from the red LD array 1 from being blocked by the reflecting part 32.

Second Embodiment

Structure of Light Source Apparatus 101

Figure 9:
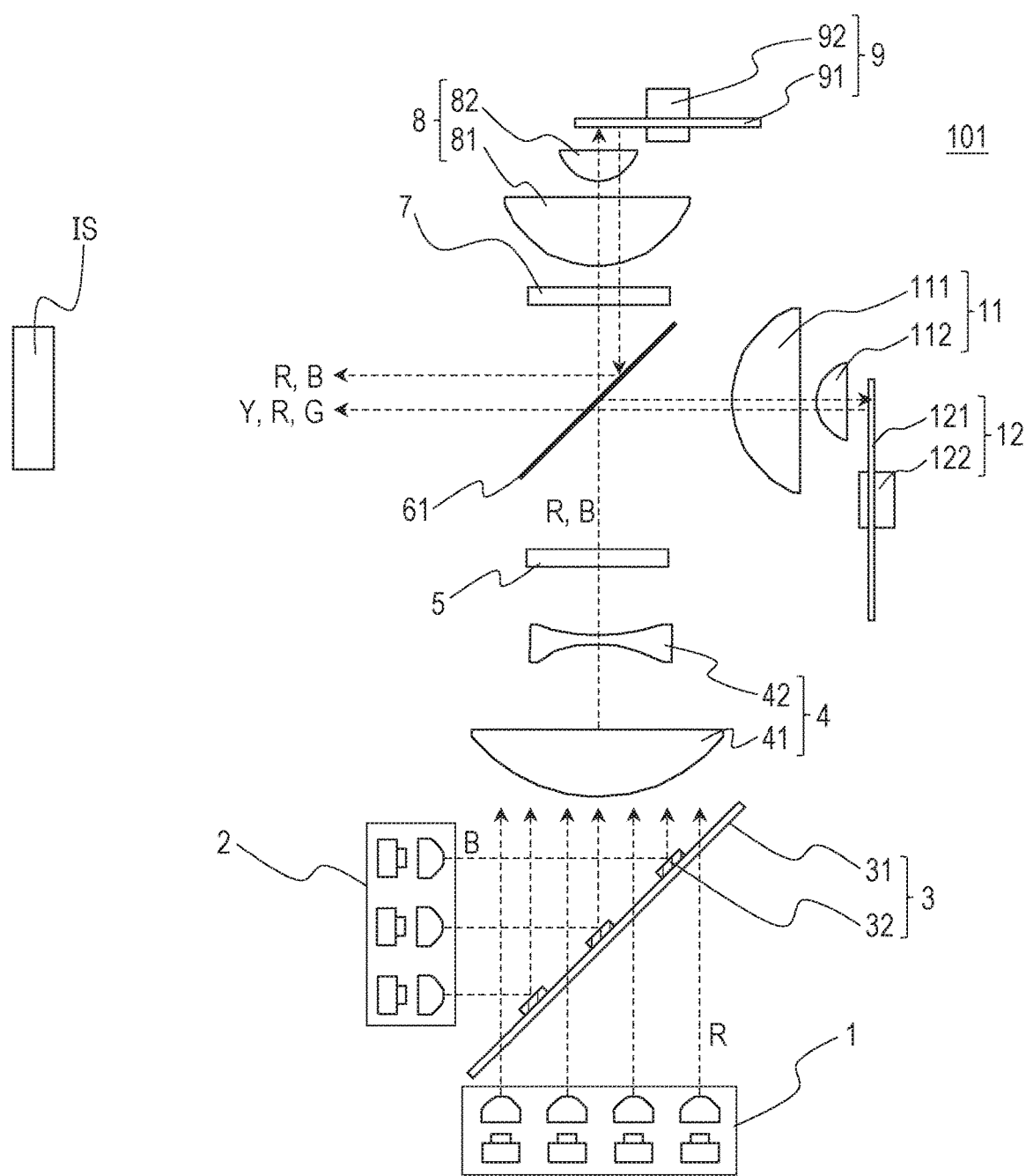
FIG. 9 illustrates a structure of a light source apparatus of a second embodiment.

Next, a structure of a light source apparatus 101 according to a second embodiment of the present invention is described with reference to FIG. 9. The light source apparatus 101 of the present embodiment differs from the light source apparatus 100 of the first embodiment above in the structure of a polarization beam splitting part and in not being provided with a quarter-wave plate 10 (FIG. 2).

Structure of Polarization Beam Splitting Part 61

Figure 10A:
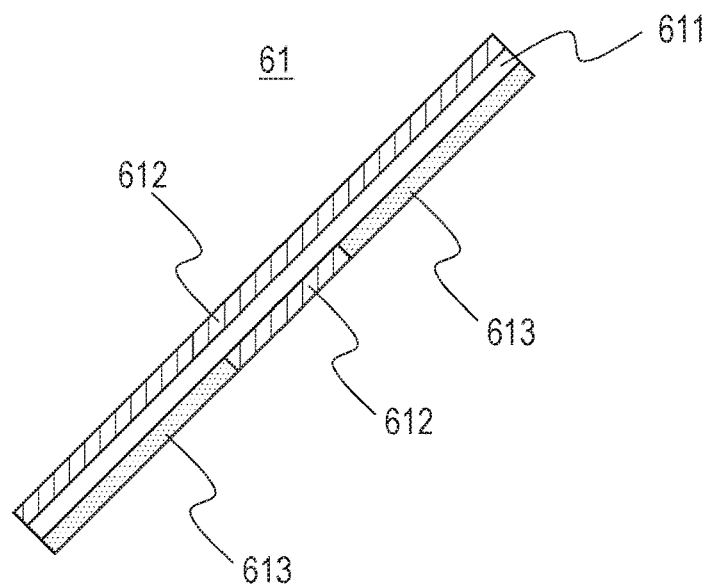
FIG. 10A illustrates a structure of a polarization beam splitting part of the second embodiment.
Figure 10B:
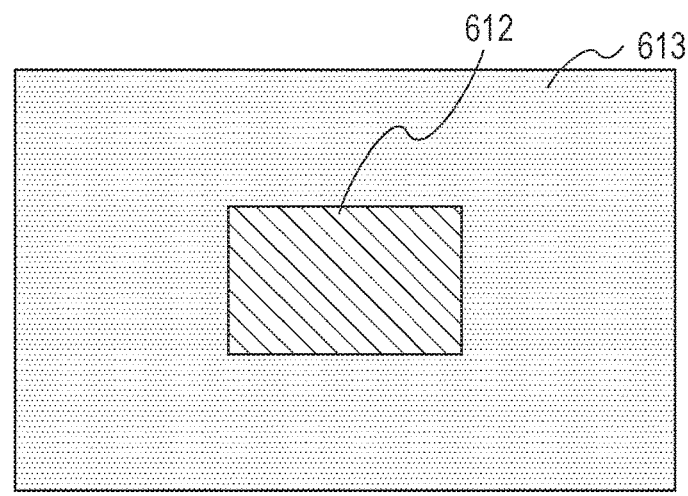
FIG. 10B illustrates the structure of the polarization beam splitting part of the second embodiment.
Figure 10C:
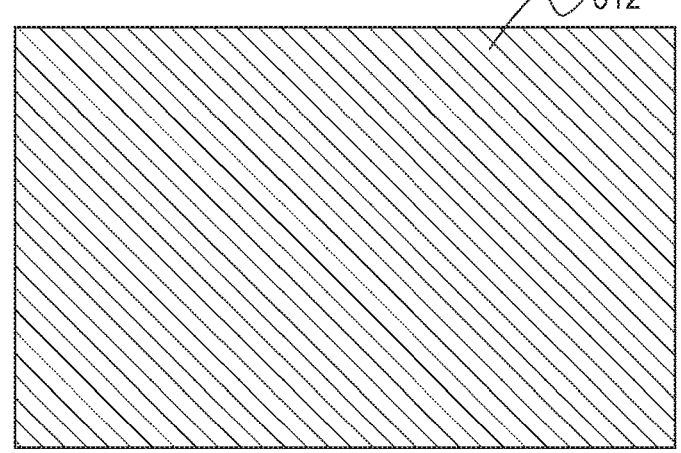
FIG. 10C illustrates the structure of the polarization beam splitting part of the second embodiment.

A structure of a polarization beam splitting part 61 is described with reference to FIGS. 10A, 10B, and 10C. As shown in FIGS. 10A, 10B, and 10C, the polarization beam splitting part 61 includes a transparent substrate 611, a polarization beam splitting film 612 and a phase difference addition part (phase difference addition region) 613 that are provided on an incident-side surface of the transparent substrate 611, and a polarization beam splitting film 612 that is provided on an exiting-side surface of the transparent substrate 611. As described with reference to FIG. 7 in the first embodiment above, the polarization beam splitting films 612 have the property of performing polarization beam splitting on blue light emitted from a blue LD array 2 and red light emitted from a red LD array 1 and transmitting types of light having wavelengths other than the wavelengths of the blue light and the red light therethrough regardless of polarization directions.

Although in the polarization beam splitting part 6 described in the first embodiment above, the polarization beam splitting film 612 is provided on the entire incident-side surface of the transparent substrate 611, in the polarization beam splitting part 61, the polarization beam splitting film 612 is provided on only a part of the incident-side surface of the transparent substrate 611. A region differing from a region where the polarization beam splitting film 612 is provided, more specifically, a vicinity of the polarization beam splitting film 612 is provided with the phase difference addition part 613. The phase difference addition part 613 has the property of converting incident S-polarized light into P-polarized light, and converting P-polarized light into S-polarized light.

The polarization beam splitting film 612 at the incident-side surface of the polarization beam splitting part 61 is provided at a position that allows almost all of the light exiting from a compression optical system 4 to be incident upon the polarization beam splitting film 612 at the incident-side surface of the polarization beam splitting part 61. When viewing the incident-side surface of the polarization beam splitting part 61 from a direction of an optical axis of the compression optical system 4, the area of the polarization beam splitting film 612 is wider than the area of light from the compression optical system 4 striking the incident-side surface of the polarization beam splitting part 61. That the other polarization beam splitting film 612 is provided on the entire exiting-side surface is the same for both the polarization beam splitting parts 6 and 61.

Optical Paths of Blue Light $B_{LD}$

Figure 11:
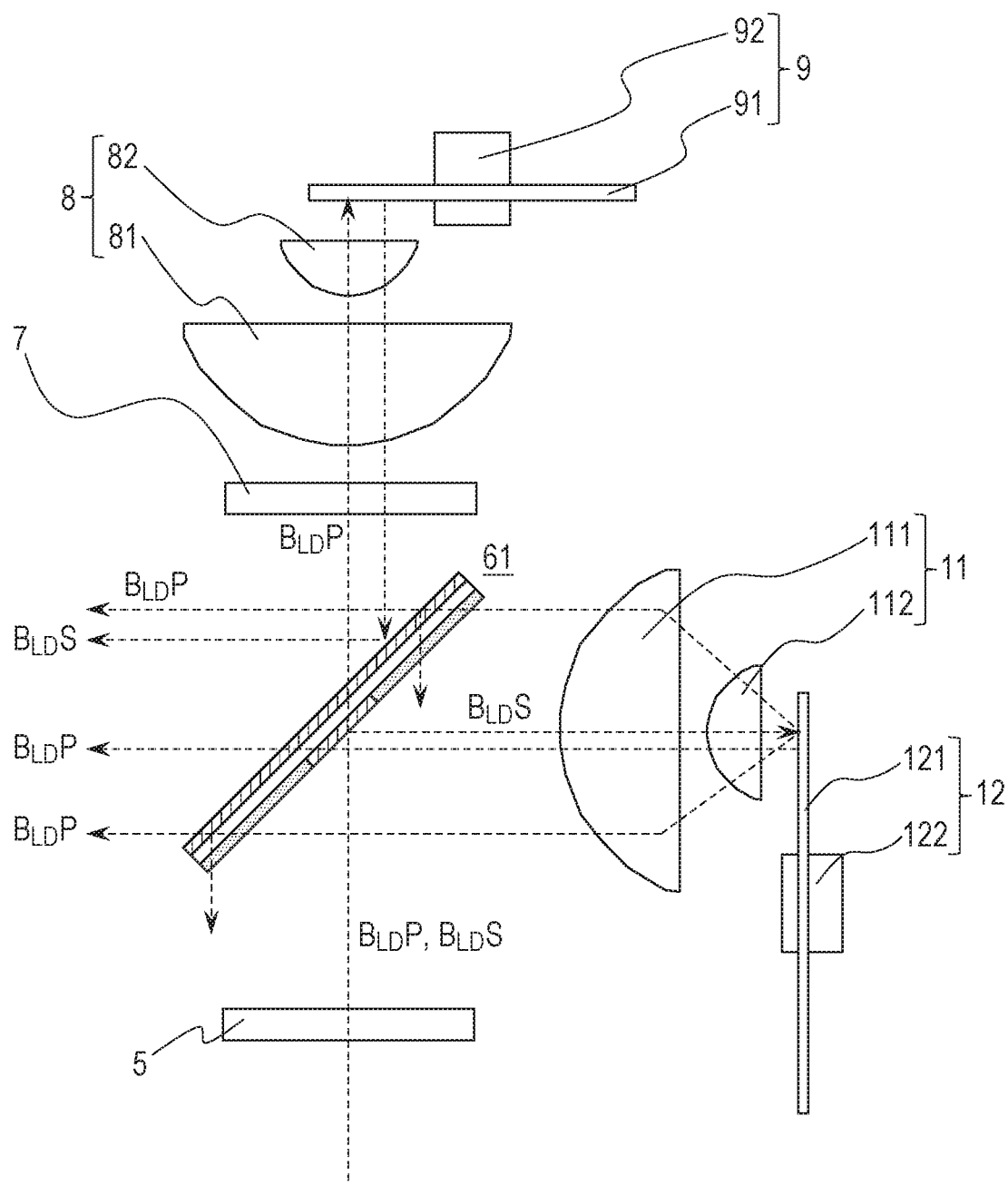
FIG. 11 illustrates an optical path of blue light in the light source apparatus of the second embodiment.

Optical paths in which blue light $B_{LD}$ emitted from the blue LD array 2 is guided to an illumination optical system IS via a diffusing body unit 9 and a fluorescent body unit 12 are described with reference to FIG. 11. Descriptions that are the same as those in the first embodiment are partly omitted.

Of blue light $B_{LD}S$ of S-polarized light and blue light $B_{LD}P$ of P-polarized light exiting from a half-wave plate 5, the blue light $B_{LD}S$ of the S-polarized light is reflected by the polarization beam splitting film 612 at the incident-side surface of the polarization beam splitting part 61 and is guided in a direction of the fluorescent body unit 12.

A component of the P-polarized light of the blue light that is unconverted blue light exiting from a yellow fluorescent body layer and incident upon the polarization beam splitting film 612 that is provided on the incident-side surface of the polarization beam splitting part 61 is transmitted through the polarization beam splitting films 612 on the respective incident side and exiting side, and is guided to the illumination optical system IS. The component of the P-polarized light of the blue light that is unconverted blue light exiting from the yellow fluorescent body layer and incident upon the phase difference addition part 613 is transmitted through the polarization beam splitting film 612 on the exiting side, and is guided to the illumination optical system IS.

Of the blue light $B_{LD}S$ of the S-polarized light and the blue light $B_{LD}P$ of the P-polarized light exiting from the half-wave plate 5, the blue light $B_{LD}P$ of the P-polarized light is transmitted through the polarization beam splitting film 612 on the incident side and the polarization beam splitting film 612 on the exiting side, and is guided in a direction of the diffusing body unit 9. Finally, the blue light $B_{LD}P$ of the P-polarized light becomes blue light $B_{LD}S$ of S-polarized light and is guided to the illumination optical system IS.

Optical Paths of Red Light $R_{LD}$

Figure 12:
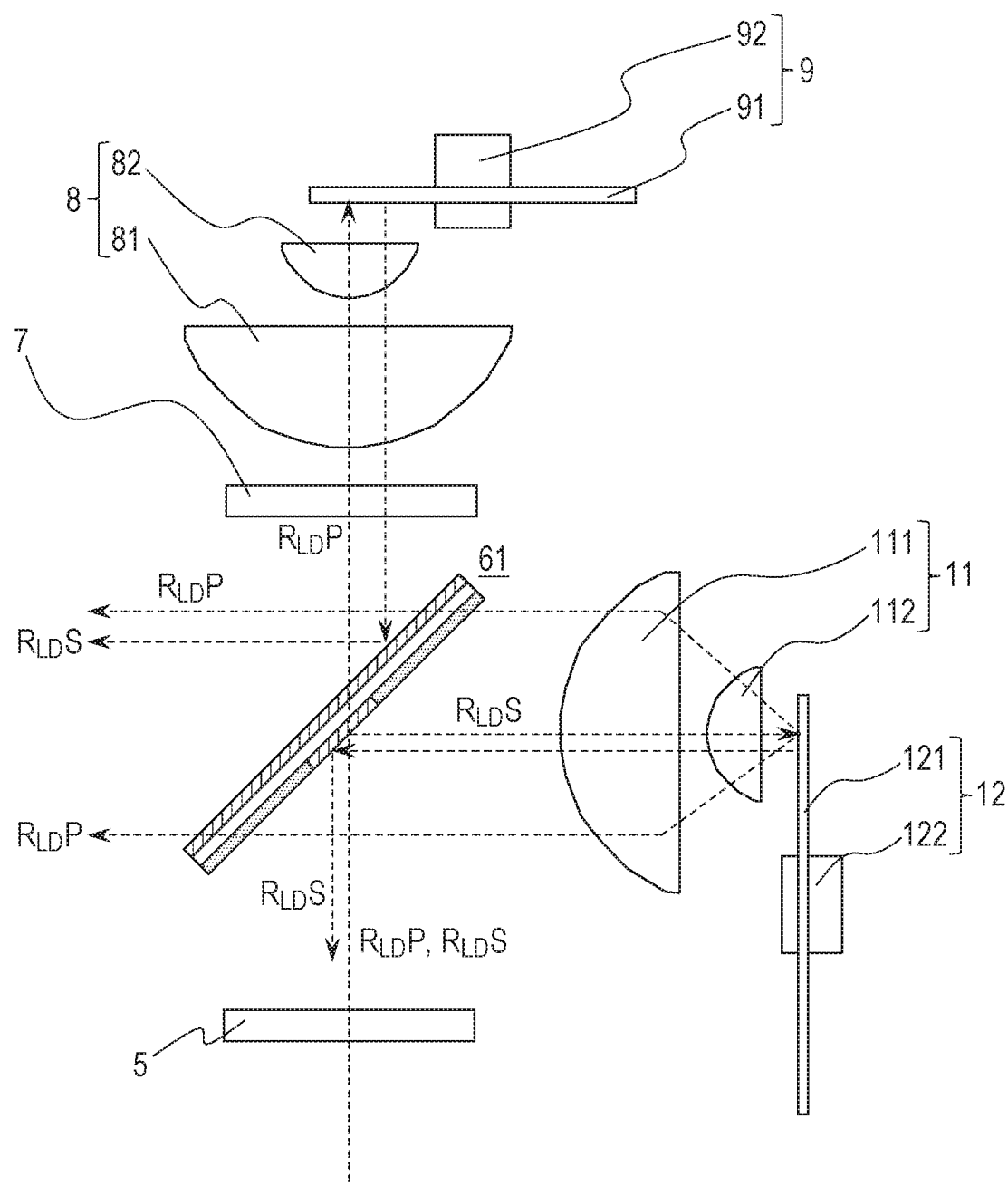
FIG. 12 illustrates an optical path of red light in the light source apparatus of the second embodiment.

Optical paths in which red light $R_{LD}$ emitted from the red LD array 1 is guided to the illumination optical system IS via the diffusing body unit 9 and the fluorescent body unit 12 are described with reference to FIG. 12. Descriptions that are the same as those in the first embodiment are partly omitted.

Of red light $R_{LD}S$ of S-polarized light and red light $R_{LD}P$ of P-polarized light exiting from the half-wave plate 5, the red light $R_{LD}S$ of the S-polarized light is reflected by the polarization beam splitting film 612 at the incident-side surface of the beam splitting part 61 and is guided in the direction of the fluorescent body unit 12.

Of the red light $R_{LD}S$ of the S-polarized light exiting from the yellow fluorescent body layer, a component that is incident upon the polarization beam splitting film 612 on the incident side returns towards the half-wave plate 5. Of the red light $R_{LD}S$ of the S-polarized light exiting from the yellow fluorescent body layer, a component that is incident upon the phase difference addition part 613 is caused to become red light $R_{LD}P$ of P-polarized light by the phase difference addition part 613, is transmitted through the polarization beam splitting film 612 on the exiting side, and is guided to the illumination optical system IS. On the other hand, the red light $R_{LD}P$ of the P-polarized light transmitted through the polarization beam splitting film 612 on the incident side moves along an optical path that is the same as that along which the blue light $B_{LD}P$ of the P-polarized light transmitted through the polarization beam splitting film 612 on the incident side moves, and is guided in the direction of the diffusing body unit 9. Finally, the red light $R_{LD}P$ becomes red light $R_{LD}S$ of S-polarized light and is guided to the illumination optical system IS.

Optical Paths of Fluorescent Light

Figure 13:
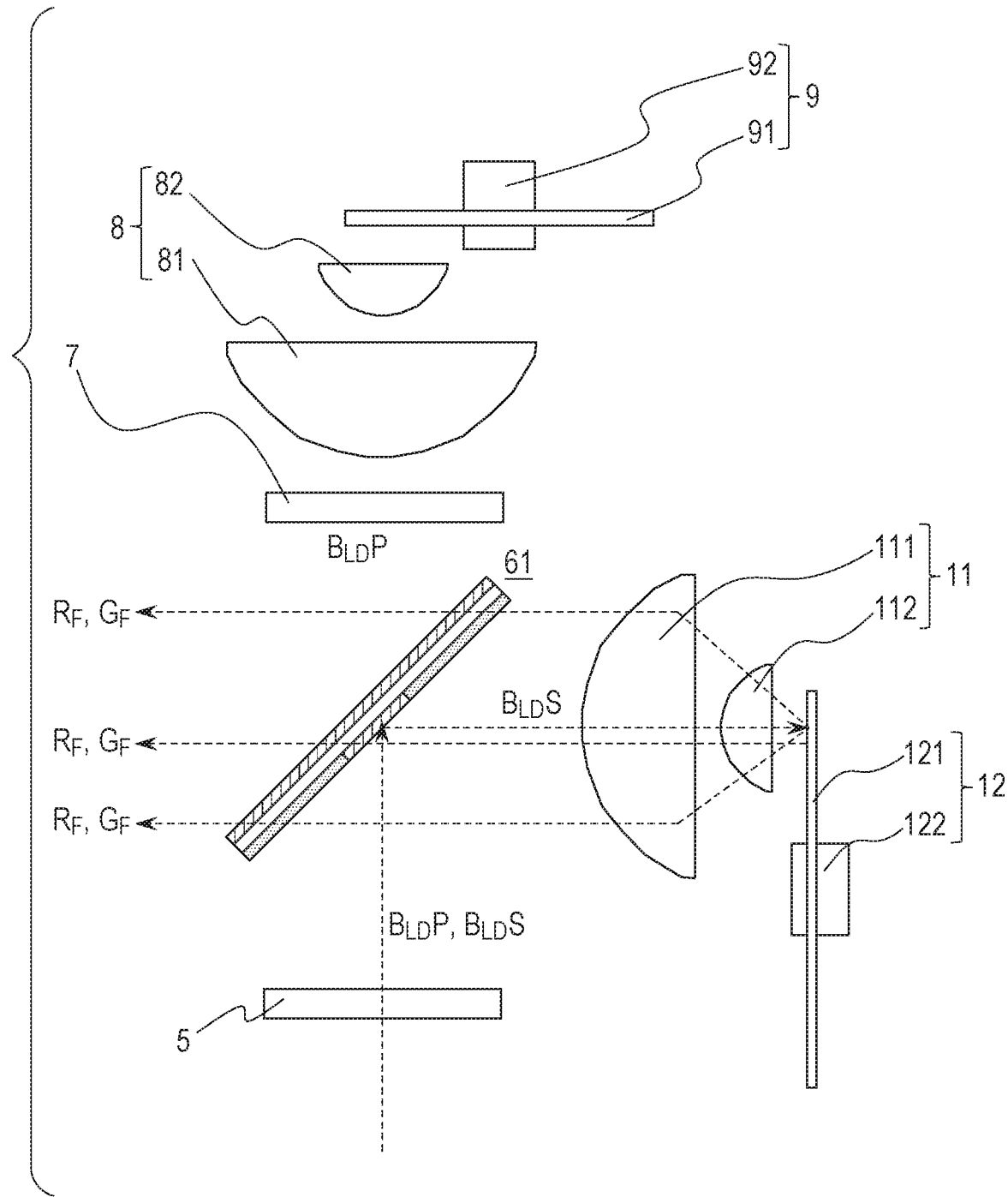
FIG. 13 illustrates an optical path of fluorescent light in the light source apparatus of the second embodiment.

Optical paths in which fluorescent light $R_F$ and fluorescent light $G_F$ emitted from the fluorescent body unit 12 are guided to the illumination optical system IS are described with reference to FIG. 13. Of the fluorescent light $R_F$ and fluorescent light $G_F$ incident upon the polarization beam splitting film 612 on the incident side, components having wavelengths differing from the wavelength of the blue light $B_{LD}$ emitted from blue LDs and the wavelength of the red light RD emitted from the red light LD are transmitted through the polarization beam splitting film 612 on the incident side and the polarization beam splitting film 612 on the exiting side, and are guided to the illumination optical system IS. Of the fluorescent light $R_F$ and fluorescent light $G_F$ incident upon the phase difference addition part 613, components having wavelengths differing from the wavelength of the blue light $B_{LD}$ emitted from the blue LDs and the wavelength of the red light $R_{LD}$ emitted from the red light LD are transmitted through the polarization beam splitting film 612 on the exiting side, and are guided to the illumination optical system IS.

If the fluorescent light $R_F$ and fluorescent light $G_F$ incident upon the polarization beam splitting film 612 on the incident side include components that are the same as the red light $R_{LD}P$ of the P-polarized light and the blue light $B_{LD}P$ of the P-polarized light, these components are also transmitted through the polarization beam splitting film 612 on the incident side and the polarization beam splitting film 612 on the exiting side, and are guided to the illumination optical system IS. If the fluorescent light $R_F$ and fluorescent light $G_F$ incident upon the polarization beam splitting film 612 on the exiting side via the phase difference addition part 613 include the same components as the red light $R_{LD}P$ of the P-polarized light and the blue light $B_{LD}P$ of the P-polarized light, these components are transmitted through the polarization beam splitting film 612 on the exiting side, and are guided to the illumination optical system IS.

As described above, the light source apparatus 101 is capable of guiding red light, green light, and blue light to the illumination optical system IS.

Effects Obtained by the Present Embodiment

In the present embodiment, the quarter-wave plate 10 of the light source apparatus 100 in the first embodiment need not be used. Therefore, compared to the first embodiment above, the light source apparatus can have a smaller number of component parts and is lighter, or can be formed at a low cost. Even in the present embodiment, as in the first embodiment above, it is possible to project a brighter image than before.

Modifications

Although desirable embodiments of the present invention have been described above, the present invention is not limited to these embodiments, and various modifications and changes are possible within the spirit thereof.

For example, although, in the first embodiment above, an example of the structure of the light source apparatus 100 including the quarter-wave plate 10 has been described, the present invention is not limited to such a structure, and may provide a structure not including a quarter-wave plate 10.

Although, in each embodiment above, the structure in which red light emitted from the red LD array 1 is transmitted through the light combining part 3 and blue light emitted from the blue LD array 2 is reflected by the light combining part 3 is exemplified, the present invention is not limited to such a structure. In contrast, in each embodiment above, a structure in which red light emitted from the red LD array 1 is reflected by the light combining part 3 and blue light emitted from the blue LD array 2 is transmitted through the light combining part 3 may be used. That is, one of the light in the first wavelength bandwidth emitted from the first light source part and the light in the second wavelength bandwidth emitted from the second light source part is light in the blue bandwidth and the other thereof is light in the red bandwidth.

Light having the blue bandwidth or blue light is light in which the wavelength of maximum intensity of light or a full width at half maximum in a spectral distribution of the light in the blue bandwidth or blue light is included in a bandwidth of 430 to 480 nm. Light having a green bandwidth or green light is light in which the wavelength of maximum intensity of light or a full width at half maximum in a spectral distribution of the light in the green bandwidth or green light is included in a bandwidth of 500 to 580 nm. Light having the red bandwidth or red light is light in which the wavelength of maximum intensity of light or a full width at half maximum in a spectral distribution of the light in the red bandwidth or red light is included in a bandwidth of 600 to 750 nm.

Although, in the first embodiment above, the polarization beam splitting films 612 are each provided on corresponding one of a half-wave-plate-5-side surface of the transparent substrate 611 and a quarter-wave plate 7-side surface of the transparent substrate 611, a polarization beam splitting film 612 may be provided on at least one of the surfaces.

Although, in each of the embodiments above, the structure in which the light combining part 3 includes an aluminum reflecting film as a reflecting part is exemplified, the present invention is not limited to such a structure. For example, in place of the aluminum reflecting film as the reflecting part, a dichroic film (color separation part) that reflects blue light emitted from the blue LD array 2 and that transmits red light emitted from the red LD array 1 therethrough may be used.

Figure 14A:
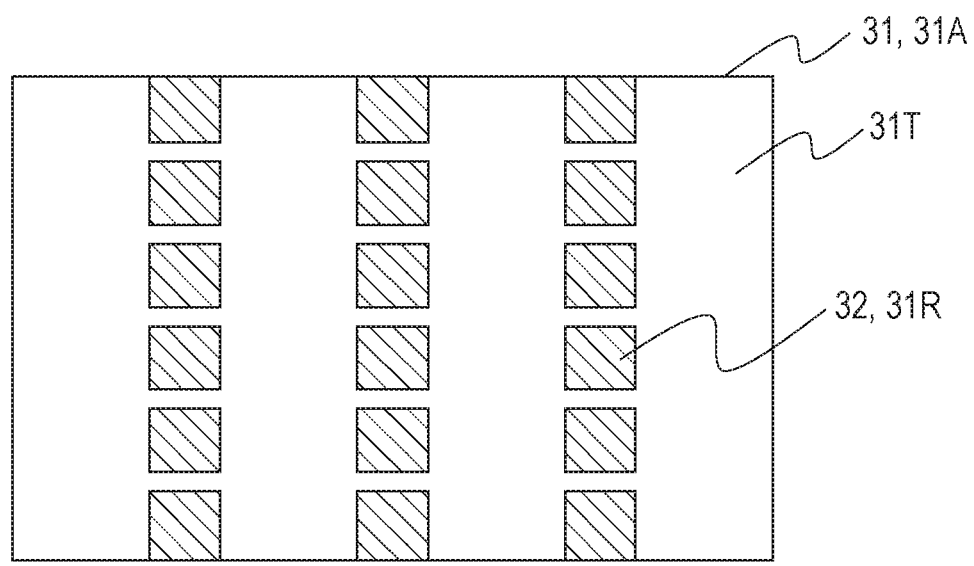
FIG. 14A illustrates a light combining part of a modification.
Figure 14B:
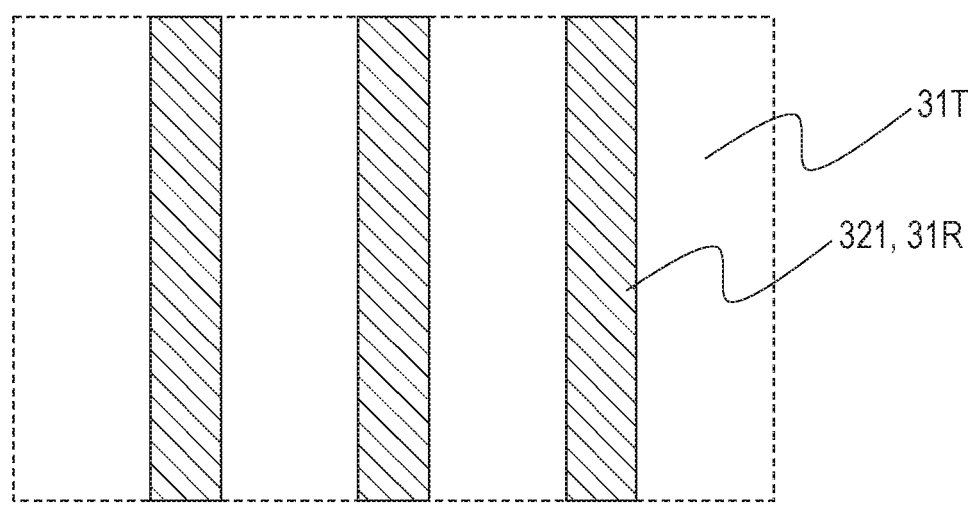
FIG. 14B illustrates a light combining part of a modification.

The light combining part 3 may have the structures shown in FIGS. 14A and 14B. More specifically, for example, a structure in which a reflecting part is disposed in the form of an array as shown in FIG. 14A or a structure in which strip-like reflecting mirrors 321 are used as reflecting parts and spaces between the reflecting mirrors 321 are transmissive regions as shown in FIG. 14B may be used. In other words, the structure shown in FIG. 14B may be called a structure in which reflecting regions are constituted by the plurality of mirrors and the transmissive regions are constituted by the spaces between the plurality of mirrors.

The surface 31B of the transparent substrate 31 may be provided with, in place of or in addition to the antireflection film, a dichroic film (color separation part) that transmits red light therethrough and reflects blue light.

In each embodiment above, the structure in which the red LD array 1 only includes red LDs as light sources and the blue LD array 2 only includes blue LDs as light sources is exemplified. However, the present invention is not limited to such a structure. For example, the red LD array 1 may include blue LDs in addition to the red LDs, and the blue LD array 2 may include red LDs in addition to the blue LDs. In other words, the light combining part only needs to include transmissive regions that transmit light emitted from the first light source part therethrough and reflecting regions that reflect light emitted from the second light source part.

The polarization direction of light emitted from the red LD array 1 and the polarization direction of light emitted from the blue LD array 2 may differ from each other. For example, when the polarization direction of light emitted from the red LD array 1 is a P-polarized light direction, the polarization direction of light emitted from the blue LD array 2 is an S-polarized light direction.

Units for combining light emitted from the first light source part and light emitted from the second light source part is not limited to the light combining part 3 above. For example, in place of the light combining part 3, a dichroic mirror that transmits light emitted from the first light source part therethrough and reflects light emitted from the second light source part may be used. Even if such a dichroic mirror is used in place of the light combining part 3, providing a quarter-wave plate 10 as in the first embodiment above makes it possible to obtain effects that are similar to those provided by the first embodiment above. In addition, even if such a dichroic mirror is used in place of the light combining part 3, providing a polarization beam splitting part 61 as in the second embodiment above makes it possible to obtain effects that are similar to those provided by the second embodiment above.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. A light source apparatus comprising:
    a first light source part that emits light in a first wavelength bandwidth;
    a second light source part that emits light in a second wavelength bandwidth differing from the first wavelength bandwidth of the light in the first wavelength bandwidth;
    a light combining part that includes a transmissive region and a reflecting region, the transmissive region transmitting the light emitted from the first light source part therethrough, the reflecting region reflecting the light emitted from the second light source part;
    a wavelength conversion part;
    a diffusing part;
    a first phase difference plate upon which light exiting from the light combining part is incident;
    a polarization beam splitting part that guides light traveling in a first polarization direction of light exiting from the first phase difference plate to the wavelength conversion part and that guides light traveling in a second polarization direction to the diffusing part, the second polarization direction differing from the first polarization direction of the light traveling in the first polarization direction; and
    a second phase difference plate that is provided between the polarization beam splitting part and the diffusing part,
    wherein one of the light in the first wavelength bandwidth and the light in the second wavelength bandwidth is light in a blue bandwidth, and the other of the light in the first wavelength bandwidth and the light in the second wavelength bandwidth is light in a red bandwidth.

2. The light source apparatus according to claim 1, wherein the light in the first wavelength bandwidth is the light in the red bandwidth, and the light in the second wavelength bandwidth is the light in the blue bandwidth.

3. The light source apparatus according to claim 1, wherein the light combining part includes a transparent substrate that is provided with a reflecting part including the reflecting region and a transmissive part including the transmissive region.

4. The light source apparatus according to claim 3, wherein the reflecting part that is provided on the transparent substrate is a color separation part that transmits the light in the first wavelength bandwidth therethrough and that reflects the light in the second wavelength bandwidth.

5. The light source apparatus according to claim 1, wherein the light combining part has a first surface on a side where the first light source part is provided and a second surface on a side where the second light source part is provided, and
    wherein an antireflection film is provided on the first surface.

6. The light source apparatus according to claim 1, wherein the light combining part has a first surface on a side where the first light source part is provided and a second surface on a side where the second light source part is provided, and
    wherein a color separation part that transmits the light in the first wavelength bandwidth therethrough and that reflects the light in the second wavelength bandwidth is provided on the first surface.

7. The light source apparatus according to claim 1, wherein an area of the transmissive region of the light combining part is wider than an area of the reflecting region of the light combining part.

8. The light source apparatus according to claim 1, wherein the reflecting region of the light combining part is constituted by a plurality of mirrors and the transmissive region of the light combining part is constituted by a space between the plurality of mirrors.

9. The light source apparatus according to claim 1, wherein the first phase difference plate is a half-wave plate, and is rotatable with a direction parallel to a direction of propagation of the light exiting from the light combining part defining a rotation axis, and
    wherein the second phase difference plate is a quarter-wave plate.

10. The light source apparatus according to claim 1, comprising:
    a third phase difference plate that is provided between the polarization beam splitting part and the wavelength conversion part.

11. The light source apparatus according to claim 10, wherein the third phase difference plate is a quarter-wave plate.

12. The light source apparatus according to claim 1, wherein the polarization beam splitting part performs polarization beam splitting on light in a first predetermined wavelength bandwidth including the light in the first wavelength bandwidth and on light in a second predetermined wavelength bandwidth including the light in the second wavelength bandwidth, and transmits or reflects light in a wavelength bandwidth differing from the first predetermined wavelength bandwidth of the light in the first predetermined wavelength bandwidth and from the second predetermined wavelength bandwidth of the light in the second predetermined wavelength bandwidth regardless of polarization directions.

13. The light source apparatus according to claim 1, wherein the first light source part includes a plurality of first light sources, and the second light source part includes a plurality of second light sources, and
wherein one of the plurality of first light sources and the plurality of second light sources has a greater number of light sources than the other, where the one emits the light in the red bandwidth.

14. The light source apparatus according to claim 2, wherein the first light source part includes a first red light source that emits first red light and a second red light source that emits second red light having a wavelength differing from a wavelength of the first red light.

15. The light source apparatus according to claim 1, wherein a polarization direction of the light in the first wavelength bandwidth and a polarization direction of the light in the second wavelength bandwidth differ from each other.

16. The light source apparatus according to claim 12, wherein a surface of the polarization beam splitting part on a side of the light combining part is provided with a region that guides the light travelling in the first polarization direction of the light exiting from the first phase difference plate to the wavelength conversion part and that guides the light travelling in the second polarization direction to the diffusing part, and with a phase difference addition region, the second polarization direction differing from the first polarization direction of the light travelling in the first polarization direction.

17. A projection type display apparatus comprising:
the light source apparatus according to claim 1;
a light modulating part that modulates light emitted from the light source apparatus; and
a holding part for holding a projection optical system that projects the light modulated by the light modulating part onto a projection surface.

18. A light source apparatus comprising:
a first light source part that emits light in a first wavelength bandwidth;
a second light source part that emits light in a second wavelength bandwidth differing from the first wavelength bandwidth of the light in the first wavelength bandwidth;
a dichroic mirror that transmits the light emitted from the first light source part therethrough and that reflects the light emitted from the second light source part;
a wavelength conversion part;
a diffusing part;
a first phase difference plate upon which light exiting from the dichroic mirror is incident;
a polarization beam splitting part that guides light travelling in a first polarization direction of light exiting from the first phase difference plate to the wavelength conversion part and that guides light travelling in a second polarization direction to the diffusing part, the second polarization direction differing from the first polarization direction of the light travelling in the first polarization direction;
a second phase difference plate that is provided between the polarization beam splitting part and the diffusing part; and
a third phase difference plate that is provided between the polarization beam splitting part and the wavelength conversion part,
wherein one of the light in the first wavelength bandwidth and the light in the second wavelength bandwidth is light in a blue bandwidth, and the other of the light in the first wavelength bandwidth and the light in the second wavelength bandwidth is light in a red bandwidth.

19. A light source apparatus comprising:
a first light source part that emits light in a first wavelength bandwidth;
a second light source part that emits light in a second wavelength bandwidth differing from the first wavelength bandwidth of the light in the first wavelength bandwidth;
a dichroic mirror that transmits the light emitted from the first light source part therethrough and that reflects the light emitted from the second light source part;
a wavelength conversion part;
a diffusing part;
a first phase difference plate upon which light exiting from the dichroic mirror is incident;
a polarization beam splitting part that guides light travelling in a first polarization direction of light exiting from the first phase difference plate to the wavelength conversion part and that guides light travelling in a second polarization direction to the diffusing part, the second polarization direction differing from the first polarization direction of the light travelling in the first polarization direction; and
a second phase difference plate that is provided between the polarization beam splitting part and the diffusing part,
wherein one of the light in the first wavelength bandwidth and the light in the second wavelength bandwidth is light in a blue bandwidth, and the other of the light in the first wavelength bandwidth and the light in the second wavelength bandwidth is light in a red bandwidth, and
wherein a surface of the polarization beam splitting part on a side of the light combining part is provided with a region that guides the light travelling in the first polarization direction of the light exiting from the first phase difference plate to the wavelength conversion part and that guides the light travelling in the second polarization direction to the diffusing part, and with a phase difference addition region, the second polarization direction differing from the first polarization direction of the light travelling in the first polarization direction.

* * * * *